June 24, 1958  G. BURROWS  2,840,388
FRAME MEMBERS
Filed Sept. 9, 1954  3 Sheets-Sheet 1
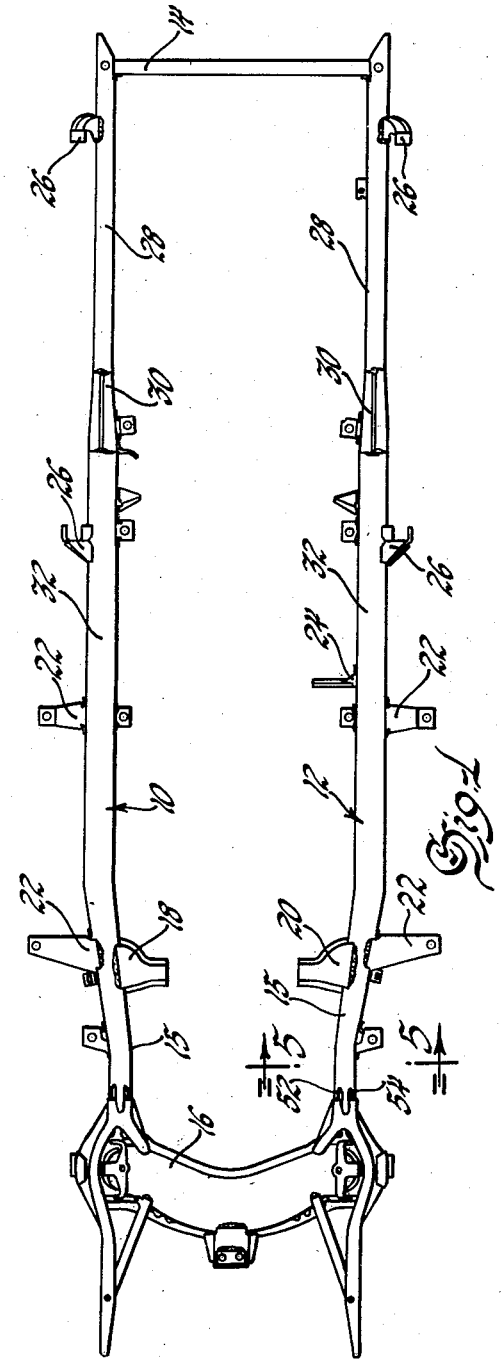
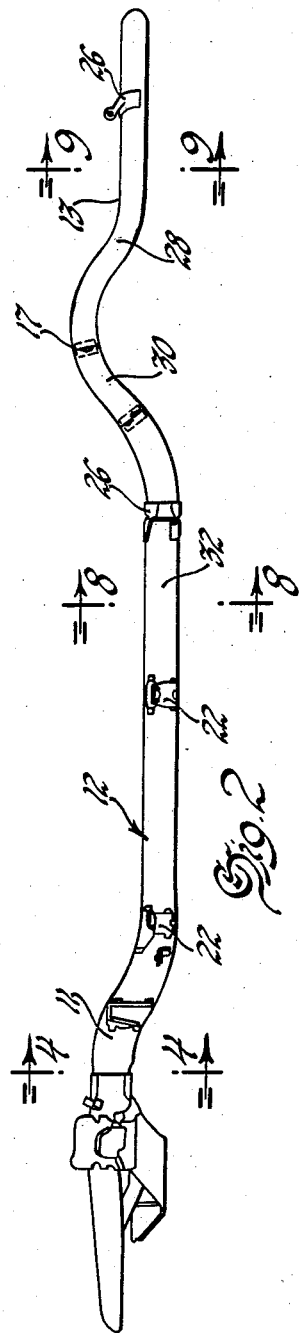
INVENTOR
Godfrey Burrows
BY
L. D. Burch
ATTORNEY June 24, 1958  G. BURROWS  2,840,388
FRAME MEMBERS
Filed Sept. 9, 1954  3 Sheets-Sheet 2
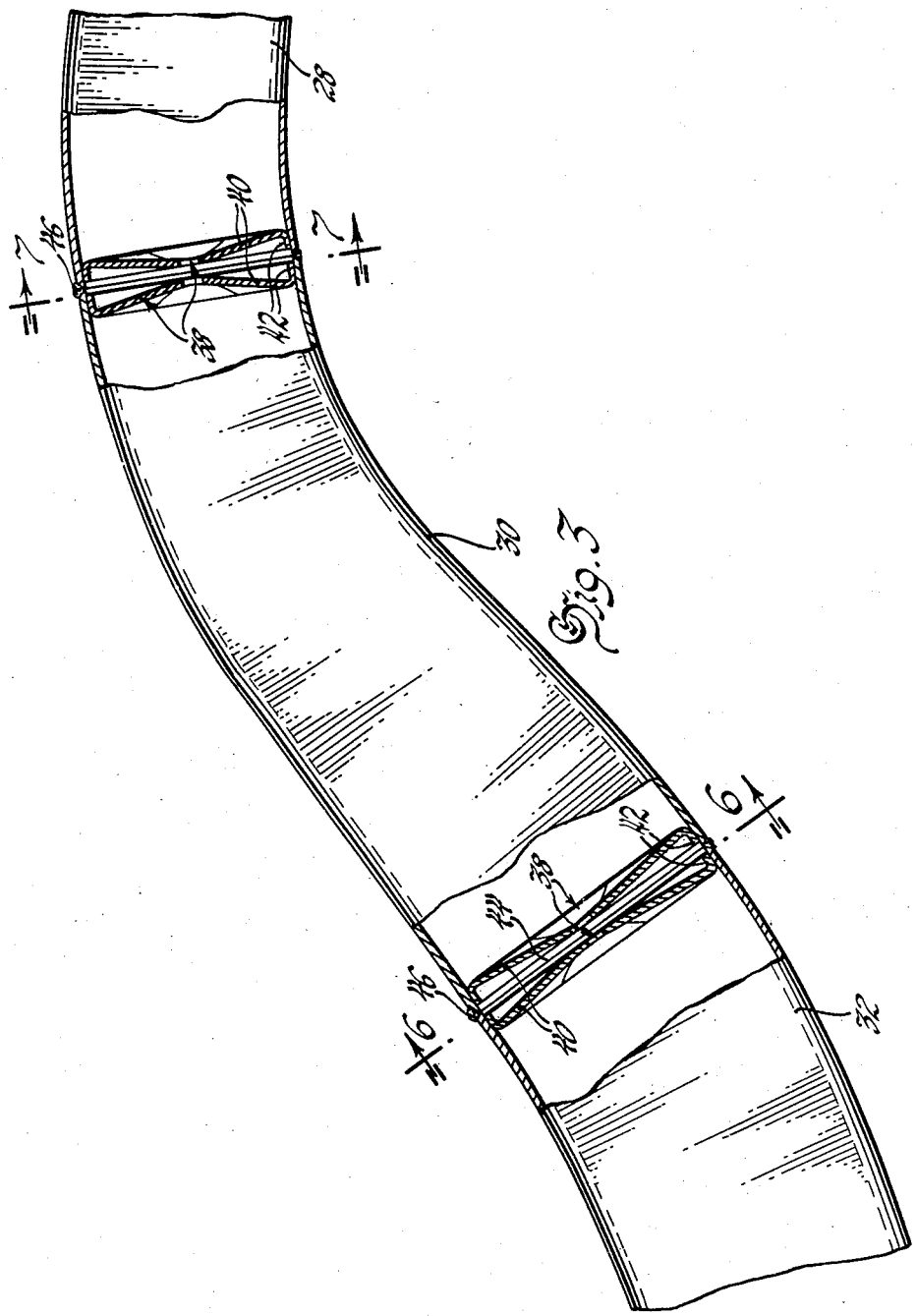
INVENTOR
Godfrey Burrows
BY
L. D. Burch
ATTORNEY

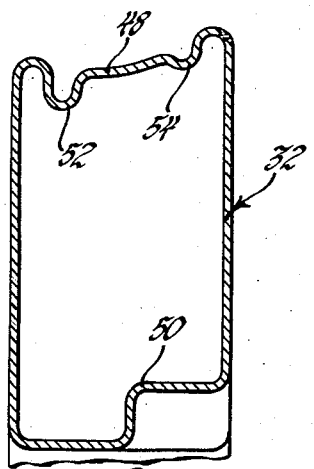
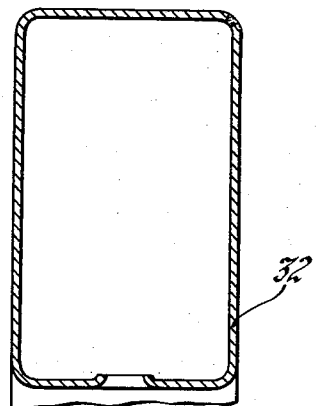
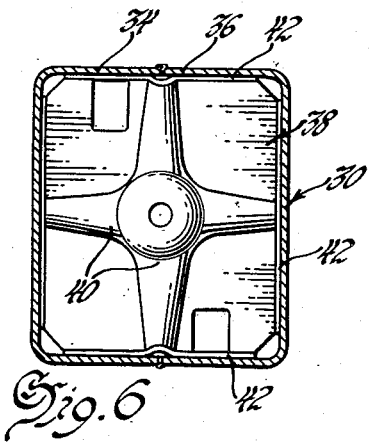
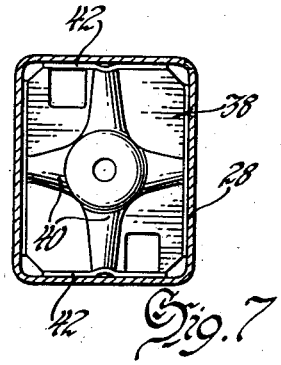
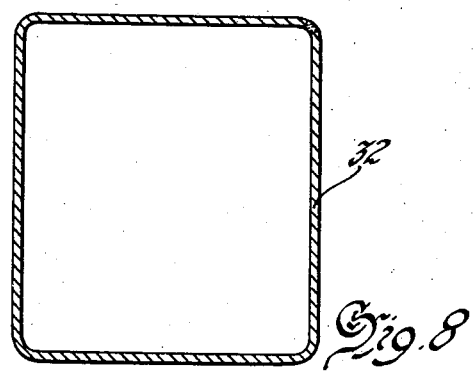
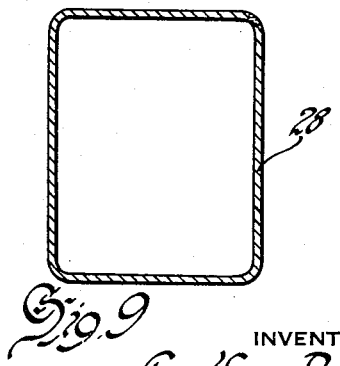

United States Patent Office 2,840,388
Patented June 24, 1958

2,840,388

FRAME MEMBERS

Godfrey Burrows, Flint, Mich., assignor to General Motors Corporation, Detroit, Mich., a corporation of Delaware Application September 9, 1954, Serial No. 455,034

10 Claims. (Cl. 280—106)

This invention relates to structural frame members generally and more particularly to structural members for use as frames in automotive and other vehicles.

Vehicle frames in the past have included channel shaped, boxed and tubular side rails and bracing members. The channel and boxed members have been most acceptable in that they may be readily varied in size and shape and formed other than straight. The tubular structural frame member on the other hand, while recognized as lighter in weight and of greater strength, does not yield itself well to being formed other than straight and of constant diameter without the likelihood of collapse in bending and of weakening in varying the cross-sectional dimension.

It is now proposed to provide a vehicle frame construction including tubular side rails. The proposed side rails include bends and varied cross-sections without weakening the frame or introducing a likelihood of tubular collapse. The side rails comprise a plurality of sections, preferably three sections, two of which are tubular in form and are joined together by a transition member formed of two abutting channel members. The tubular sections may thus initially be of different cross-sections. The tubular sections of the side rails are formed to provide a rectangular cross-section which may be varied in shape without varying the peripheral dimension by the transposition of material from the top to the sides of the rail. A smaller cross-section is also readily formed by wrinkling or forming part of the tubular wall within its own peripheral limits. It is proposed to provide structural spacers or braces between adjacent sections of the side rail for strengthening the ends of the members and enabling greater ease of assembly. The transition section is proposed to be located within the critical bend of the vehicle frame in the vicinity of the rear kick-up portion of the frame to reduce the chance of collapse in so bending a tubular member.

It is proposed to provide a frame member which may be inexpensively made from sheet material which is formed by rolling and is seam welded. It is further proposed to provide a frame member such as may be formed of varied cross-sections. In use with automotive vehicles it is proposed to provide a frame assembly having no intermediate crossrails or braces. The floor of the vehicle body may be used as a structural member to reinforce the frame. The tubular structural members here proposed are considered of greater strength and durability than previously proposed frame members and to be more easily made and assembled than other frame members presently in use.

In the drawings:

Figure 1 is a top view of an automotive frame assembly embodying the present invention.

Figure 2 is a side elevational view of the frame assembly of Figure 1.

Figure 3 is an enlarged side view of a part of the vehicle frame having a portion broken away and shown in cross-section.

Figure 4 is a cross-sectional end view of one side rail of the vehicle frame of Figure 2 taken in the plane of line 4—4 and viewed in the direction of the arrows thereon.

Figure 5 is a cross-sectional end view of one of the frame members shown in Figure 1 taken in the plane of line 5—5 and viewed in the direction of the arrows thereon.

Figure 6 is a cross-sectional view of one of the structural brace members taken in the plane of line 6—6 of Figure 3 and viewed in the direction of the arrows thereon.

Figure 7 is a cross-sectional view of another brace member taken in the plane of line 7—7 of Figure 3 and viewed in the direction of the arrows thereon.

Figures 8 and 9 are cross-sectional views of the frame member of Figure 2 taken in the planes of lines 8—8 and 9—9 respectively and viewed in the direction of the arrows thereon.

The automotive vehicle frame shown in Figures 1 and 2 includes side rails 10 and 12, a rear crossbrace 14, and a front crossbrace assembly 16. There are no intermediate cross members other than the front and rear braces 16 and 14. Inwardly extended engine mount brackets 18 and 20 are secured to side rails 10 and 12, respectively to support an engine in combination with the front crossbrace assembly 16. Additional bracing of the frame will be provided through the engine block. Body support brackets 22, tail pipe hanger 24, suspension assembly brackets 26 and the like are also secured to the side rails 10 and 12. A vehicle body when secured to the body support brackets 22 will lend additional structural reinforcement to the vehicle frame.

The side rails 10 and 12 are each formed of a plurality of sections or members, preferably three, which include a rear tubular section 28, an intermediate or transition section 30 and a forward tubular section 32. The tubular sections 28 and 32 need not be of the same tubular cross-section, as is shown. Each tubular section 28 and 32 is formed in rectangular cross-section as shown in Figures 9 and 8 respectively. The transition member may be tubular in form but is preferably formed of two channel members 34 and 36 butt or lap welded together. The channel member construction is found more acceptable where there is appreciable variance in the diameters of the two tubular sections 28 and 32 to be joined. A channel member construction may more easily be formed having ends of different and varied cross-section, although a tube might be swaged in an acceptable manner.

The side rails 10 and 12 are vertically offset at each end as shown in Figure 2 at 11 and 13. The forward tubular section 32 of each side rail is also offset horizontally as shown in Figure 1 at 15 and is formed to include a greater vertical than horizontal dimension or depth to provide increased structural strength for accommodating the vehicle engine (not shown) received at that end of the frame assembly. Each side rail 10 and 12 is further formed to provide an arcuate portion 17 more commonly referred to in vehicle frames as a rear kick-up. The kick-up portion 17 is adapted to accommodate a rear axle assembly, not here shown, and is arcuately formed to carry the frame member over the rear axle.

The transition member 30 is disposed in the vicinity of the rear kick-up 17 of each of the side rails 10 and 12. Such location eliminates the excessive bending which would otherwise be required if one of the tubular sections 28 or 32 were disposed at such position. Within the ends of the tubular sections 28 and 32 and of the transition member 30 are secured by spot welding or other means, transverse supports or form braces 38 which are adapted to assure the proper shape of the end of the section or member in which it is secured and to facilitate greater ease of assembly in joining the tubular members 28 and 32 to the transition member 30. The supports 38 are formed from sheet material and include crossribs 40 and flanges 42 adding additional strength thereto. The braces 38 are inserted just back from the ends of members 28, 30 and 32 leaving a weld area 44. The respective members are butted together and a flash weld 46 is then applied about the ends of the tubular members 28 and 32 and the transition member 30 in the weld area 44 to securely hold the frame sections rigidly together.

The forward ends of tubular members 32 are required to be of a smaller peripheral dimension. Rather than swage or otherwise reduce the tubular cross-section which would be quite costly, the circumferential portions of the ends of members 32 are formed or wrinkled within their normal peripheral dimension as shown in Figure 4. The end of each side rail 10 and 12 may thus be formed to any desired shape or dimension which will permit greater ease of assembly with the front crossbrace assembly 16, or to provide a curved top surface 48, angled or stepped portion 50, or any other configuration. Sufficient of the peripheral material is used to form the wrinkles 52 and 54 within the outer-defined limits of the ends of the rails to enable forming the rails to the size and configuration required.

I claim:

1. A vehicle frame comprising a pair of side rails disposed in parallel spaced relation and having brace members secured thereto and extended between adjacently disposed ends thereof, said side rails including seam welded tubular sections each of substantially constant diameter and comparatively of different diameters and an intermediate member having said tubular sections secured in end-to-end relation therewith.

2. The frame of claim 1 having said side rails vertically offset near one end thereof and the tubular sections forming said side rails formed to a rectangular cross-section with the portion of said section within said offset having a greater vertical section and a reduced horizontal section without a change in peripheral dimension to provide additional strength to said side rail within said offset.

3. The frame of claim 1 having said tubular sections formed to provide a rectangular cross-section of varied size and configuration by the forming and wrinkling of excess material within the outer-defined limits thereof to provide greater ease of assembly with other members of smaller peripheral measurements.

4. A vehicle frame comprising side rails vertically offset at opposite ends thereof, the forward ends of said side rails being also horizontally offset and the after ends including a kick-up portion, said side rails including seam welded tubular members and an intermediate boxed member secured therebetween, said intermediate member being disposed within said kick-up portion.

5. The vehicle frame of claim 4 having said tubular members formed to a rectangular cross-section of constant peripheral dimension with the portion thereof within one of said vertically offset ends having a greater vertical than horizontal section to provide additional structural strength thereto.

6. A tubular side rail forming a part of a vehicle frame, said side rail including a kick-up portion near one end thereof, said rail including end sections formed of seam welded tubular stock of different diameters and an intermediate member having said end sections secured to opposite ends thereof, said intermediate section being disposed wholly within the kick-up portion of said rail to provide greater strength thereat and to reduce the amount of bending required of said tubular end sections in forming said kick-up portion.

7. A vehicle frame including a pair of side rails disposed in parallel spaced relation, brace members secured between adjacently disposed ends of said side rails, each of said side rails including tubular end sections of rectangular cross-section and an intermediate member having said end sections secured to opposite ends thereof, and form braces telescoped and secured within and near the ends of said end sections and said intermediate member to hold said ends to a given rectangular shape to enable butt welding of said end sections to said intermediate member.

8. A vehicle frame including a pair of side rails disposed in parallel spaced relation, brace members secured to said side rails between adjacently disposed ends thereof, each of said side rails including seam welded tubular end sections of rectangular cross-section and an intermediate member having said end sections secured to opposite ends thereof, each of said side rails having a kick-up portion near one end thereof, said intermediate member being disposed within said kick-up portion, said end sections including a vertically offset portion having an increased vertical dimension and decreased horizontal dimension without peripheral change for providing greater structural strength within said offset portion.

9. A vehicle frame comprising a pair of side rail members disposed in parallel spaced relation and having brace members secured thereto and extended between only adjacently disposed ends thereof, said side rails including seam welded tubular members of different diameters formed in rectangular cross-section and an intermediate member formed by a pair of channel members secured together to provide a closed box section, said intermediate member having opposite ends thereof secured to said tubular members of different diameters in end-to-end relation therewith to form a contiguous frame side rail.

10. A vehicle frame member comprising a pair of side rails disposed in parallel spaced relation and having cross bracing members secured between only adjacently disposed ends thereof, said side rails each including seam welded tubular members of different diameters formed in rectangular cross-section and having box sectioned channel members secured therebetween, said last-mentioned members having opposite ends formed to receive said tubular members in abutting relation thereto, and form braces interposed in telescoping relation between said tubular members and said box sectioned channel members for aligning and securing said members together, said tubular members having varied cross-sectional dimensions to best provide structural strength at needed locations including the forming or wrinkling of the surface areas thereof within peripheral confines to reduce the cross-sectional size of such members.

References Cited in the file of this patent

UNITED STATES PATENTS

| | | |
|---|---|---|
| 2,173,525 | Wallace | Sept. 19, 1939 |
| 2,192,560 | Riemenschneider | Mar. 5, 1940 |
| 2,194,356 | Ecklund | Mar. 19, 1940 |
| 2,257,664 | Almdale | Sept. 30, 1941 |
| 2,603,506 | Johnson | July 15, 1952 |